US012652463B2

(12) United States Patent　　　　(10) Patent No.:　US 12,652,463 B2

Geng et al.　　　　　　　　　　　　(45) Date of Patent:　　Jun. 9, 2026

---

(54) VEHICLE MONITORING AND DISPLAY SYSTEM

(71) Applicant: AUO Corporation, Hsinchu City (TW)

(72) Inventors: Chi-Yu Geng, Hsinchu City (TW);
Shang Chien Wu, Hsinchu City (TW);
Kai-Yi Lu, Hsinchu City (TW);
Hung-Chi Wang, Hsinchu City (TW);
Chuo Hsian Lin, Hsinchu City (TW)

(73) Assignee: AUO Corporation, Hsinchu City (TW)

( * ) Notice: Subject to any disclaimer, the term of this patent is extended or adjusted under 35 U.S.C. 154(b) by 0 days.

(21) Appl. No.: 18/954,495

(22) Filed: Nov. 20, 2024

(65) Prior Publication Data

US 2026/0006321 A1　　Jan. 1, 2026

(30) Foreign Application Priority Data

Jun. 26, 2024　(TW) ................................. 113123768

(51) Int. Cl.
*G06F 3/147*　　　　(2006.01)
*H04N 23/60*　　　　(2023.01)

(52) U.S. Cl.
CPC ........... *H04N 23/665* (2023.01); *G06F 3/147* (2013.01)

(58) Field of Classification Search
None
See application file for complete search history.

(56) References Cited

U.S. PATENT DOCUMENTS

| | | |
|---|---|---|
| 10,768,356 B1 | 9/2020 | Zhang et al. |
| 2009/0180009 A1* | 7/2009 | Kanade ................. H04N 5/2222 |
| | | 348/E5.022 |
| 2020/0374510 A1* | 11/2020 | Berends ................... B23K 9/32 |
| 2021/0407440 A1 | 12/2021 | Liu |
| 2024/0152244 A1* | 5/2024 | DeDonato ............... G06F 1/163 |
| 2025/0175585 A1* | 5/2025 | Zhang ................. H04N 13/383 |

FOREIGN PATENT DOCUMENTS

| | | |
|---|---|---|
| JP | 2007163816 | 6/2007 |
| WO | 2020248631 | 12/2020 |

\* cited by examiner

*Primary Examiner* — Edemio Navas, Jr.
(74) *Attorney, Agent, or Firm* — JCIPRNET

(57) ABSTRACT

A vehicle monitoring and display system are provided. The vehicle monitoring and display system includes an image controller, a transparent display apparatus and an image sensor. The image controller provides a frame display signal and a frame synchronization signal. The transparent display apparatus is coupled to the image controller to perform display based on the frame display signal. The image sensor is covered by a part of the transparent display apparatus and is coupled to the image controller to capture images based on the frame synchronization signal when the part of the transparent display apparatus renders transparent.

8 Claims, 7 Drawing Sheets

VEHICLE MONITORING AND DISPLAY SYSTEM

CROSS-REFERENCE TO RELATED APPLICATION

This application claims the priority benefit of Taiwan application serial no. 113123768, filed on Jun. 26, 2024. The entirety of the above-mentioned patent application is hereby incorporated by reference herein and made a part of this specification.

BACKGROUND

Technical Field

The disclosure relates to a monitoring system, and particularly relates to a vehicle monitoring display system.

Description of Related Art

Driver Monitoring System (DMS) and Occupant Monitoring System (OMS), also known as cabin monitoring systems, are vehicle safety systems that use image cameras or sensors to monitor the driver's behavior/state, used to issue warnings to the driver when necessary, or used to provide automatic steering or braking for self-driving vehicles. However, the image cameras or sensors are usually disposed separately from a display apparatus, affecting the arrangement and visual perception of interior space of vehicles.

SUMMARY

The disclosure provides a vehicle monitoring and display system, which may allow image sensors to be disposed to overlap with a transparent display, improving the arrangeability of the interior space of the vehicles and enhancing the visual perception of the interior space of the vehicles.

The vehicle monitoring and display system of the disclosure includes an image controller, a transparent display apparatus, and an image sensor. The image controller provides a frame display signal and a frame synchronization signal. The transparent display apparatus is coupled to the image controller to display based on the frame display signal. The image sensor is masked by a part of the transparent display apparatus in view of a driver and coupled to the image controller to capture images when the part of the transparent display apparatus is rendered transparent based on the frame synchronization signal.

Based on the above, in the vehicle monitoring and display system of embodiments of the disclosure, the transparent display apparatus and the image sensor may operate synchronously based on the frame synchronization signals, allowing the image sensor to capture images when not masked by the images displayed on the transparent display apparatus. Therefore, the image sensor may be disposed under a panel of the transparent display apparatus without affecting image capture, thereby omitting the corresponding arrangement space. Therefore, the vehicle monitoring and display system may improve the arrangeability of the interior space of the vehicles and enhance the visual perception of the interior space of the vehicles.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Unless otherwise defined, all terminology (including technical and scientific terminology) used herein has the same meaning as commonly understood by those of ordinary skill in the art to which this invention belongs. It will be further understood that terms, such as those defined in commonly used dictionaries, should be interpreted as having a meaning that is consistent with their meaning in the context of the relevant art and the disclosure, and will not be interpreted in an idealized or overly formal sense unless expressly so defined herein.

It should be understood that although the terms "first," "second," "third," etc. may be used herein to describe various components, parts, areas, layers and/or sections, these components, parts, areas, layers and/or sections should not be limited by these terms. These terms are only used to distinguish one component, part, area, layer or section from another component, part, area, layer or section. Thus, a "first component," "part," "area," "layer" or "section" discussed below could be termed a second component, part, area, layer or section without departing from the teachings herein.

The terminology used herein is for the purpose of describing particular embodiments only and is not intended to be limiting. As used herein, the singular forms "a," "an," and "the" are intended to include the plural forms as well, including "at least one," unless the context clearly indicates otherwise. "Or" means "and/or." As used herein, the term "and/or" includes any and all combinations of one or more of the associated listed items. It will be further understood that the terms "includes" and/or "including," when used in this specification, specify the presence of stated features, regions, integers, steps, operations, elements, and/or components, but do not preclude the presence or addition of one or more other features, regions, integers, steps, operations, elements, components, and/or groups thereof.

Figure 1:
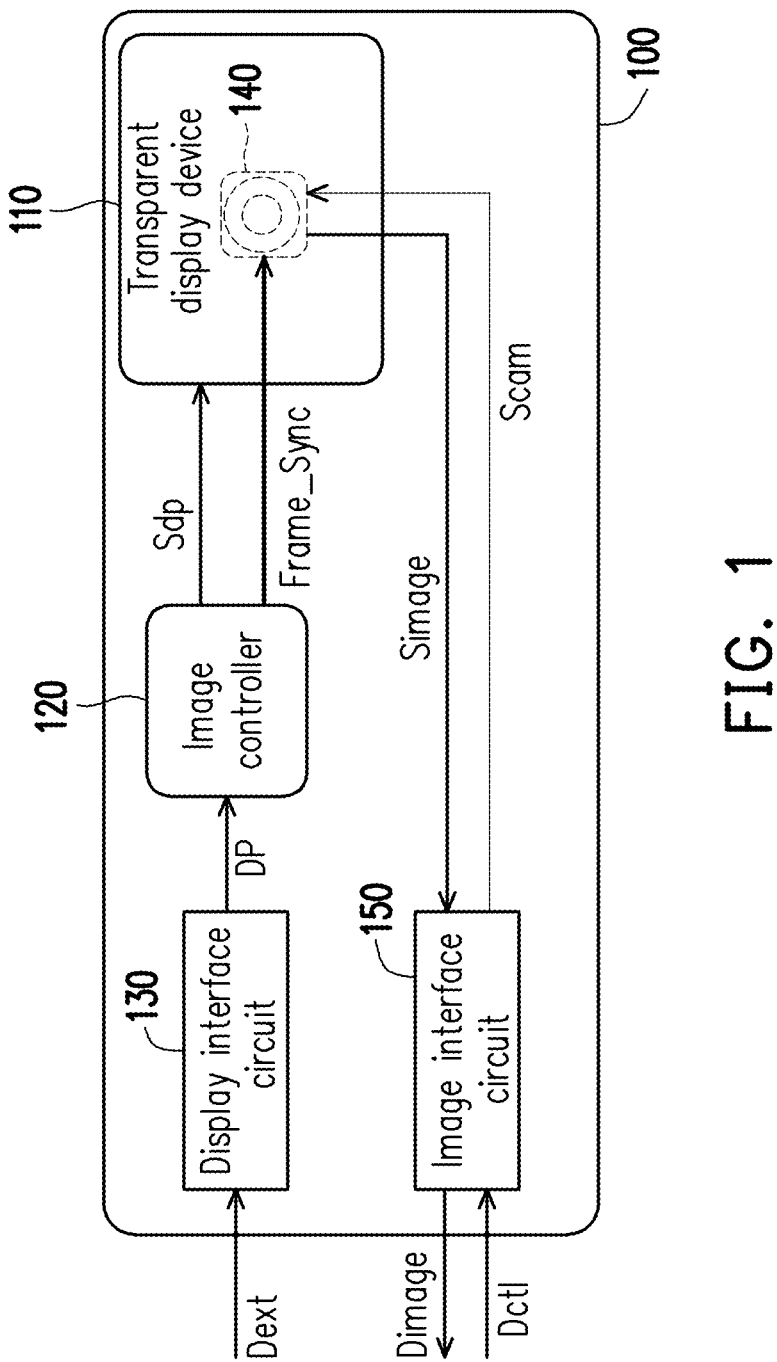
FIG. 1 is a system diagram illustrating a vehicle monitoring and display system according to an embodiment of the disclosure.

FIG. 1 is a system diagram illustrating a vehicle monitoring and display system according to an embodiment of the disclosure. Referring to FIG. 1, in the present embodiment, the vehicle monitoring and display system 100 may be applied to a driver monitoring system and/or a passenger monitoring system, i.e. the vehicle monitoring and display system 100 may be a part of a driver monitoring system or a passenger monitoring system. In the present embodiment, the vehicle monitoring and display system 100 includes a transparent display apparatus 110, an image controller 120, a display interface circuit 130, an image sensor 140, and an image interface circuit 150.

The image controller 120 provides a frame display signal Sdp and a frame synchronization signal Frame_Sync. The transparent display apparatus 110 is coupled to the image controller 120 to perform display based on the frame display signal Sdp. The image sensor 140 is masked by a part of the transparent display apparatus 110 in view of a driver and coupled to the image controller 120 to capture images based on the frame synchronization signal Frame_Sync when the part of the transparent display apparatus 110 is rendered unlit (i.e., rendered transparent).

According to the above, the transparent display apparatus 110 and the image sensor 140 may operate synchronously based on the frame synchronization signal Frame_Sync, allowing the image sensor 140 to capture images when it is not masked by the images displayed on the transparent display apparatus 110. Therefore, the image sensor 140 may be disposed under a panel of the transparent display apparatus without affecting image capture, thereby omitting the corresponding arrangement space, and thereby may improving the arrangeability of the interior space of a vehicle and enhance the visual perception of the interior space of the vehicle.

In the present embodiment, the display interface circuit 130 is coupled to the image controller 120 and receives an external data Dext provided by an external control circuit (such as a control circuit 200 shown in FIG. 5) to generate a display signal DP to the image controller 120 based on the external data Dext. Furthermore, the image controller 120 generates the frame display signal Sdp and the frame synchronization signal Frame_Sync based on the display signal DP.

In the present embodiment, the image interface circuit 150 is coupled to the image sensor 140 and receives a control data Dct1 provided by the external control circuit (such as the control circuit 200 shown in FIG. 5) to provide a camera control signal Scam to the image sensor 140, thereby controlling the imaging behavior of the image sensor 140. Furthermore, the image interface circuit 150 generates an image data Dimage based on an image signal Simage from the image sensor 140, to provide to the corresponding external control circuit (such as the control circuit 200 shown in FIG. 5).

In the embodiments of the disclosure, the frame synchronization signal Frame_Sync may be a voltage level signal (i.e., a signal switching between a high voltage level and a low voltage level), or may be a control command transmitted by an Inter-Integrated Circuit (I2C) signal or a Serial Peripheral Interface (SPI) signal, but the embodiments of the disclosure is not limited to these.

In the present embodiment of the disclosure, the transparent display apparatus 110 may be a micro light-emitting diode (uLED) display, but the embodiment of the disclosure is not limited there.

In the present embodiment of the disclosure, the display interface circuit 130 and the image interface circuit 150 may each include at least one of serializer and deserializer, but the embodiment of the disclosure is not limited there.

In the present embodiment of the disclosure, the transparent display apparatus 110 may be a transparent display that illuminates simultaneously for global (i.e., be not a transparent display that illuminates sequentially by row scanning). In this case, the image controller 120 calculates the timing for inserting black frames (i.e., capture periods L01, L02) based on a exposure time and a sampling frequency of the image sensor 140. When the image controller 120 issues the frame synchronization signal Frame_Sync, the image sensor 140 performs image capture according to the frame synchronization signal Frame_Sync.

In the present embodiment of the disclosure, the transparent display apparatus 110 may be a transparent display that illuminates sequentially by row scanning. In this case, when the image controller 120 issues the frame synchronization signal Frame_Sync, the image sensor 140 may perform image capture when the pixel row area covering the image sensor 140 (i.e., the pixel rows masked by the projection area of the image sensor 140) is not illuminated.

In the present embodiment of the disclosure, the exposure time and the sampling frequency may change due to different application environments of the image sensor 140 (e.g., day and night), thereby using different timing configurations for display and image capture.

Figures 2, 3:
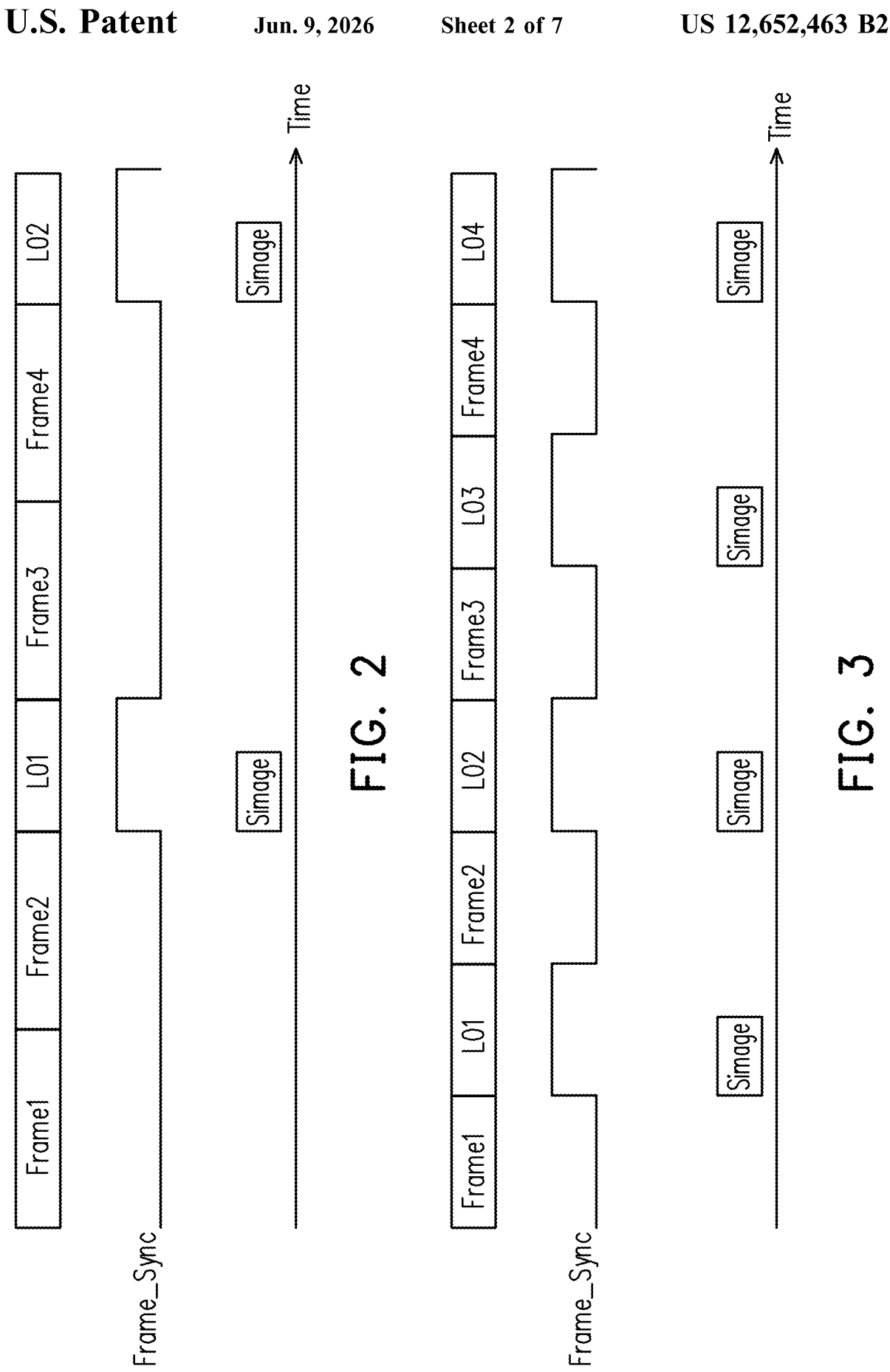
FIG. 2 is a first timing diagram illustrating the operation of the vehicle monitoring and display system according to an embodiment of the disclosure.
FIG. 3 is a second timing diagram illustrating the operation of the vehicle monitoring and display system according to an embodiment of the disclosure.

FIG. 2 is a first timing diagram illustrating the operation of the vehicle monitoring and display system according to an embodiment of the disclosure. Referring to FIG. 1 and FIG. 2, in the present embodiment, the period when the transparent display apparatus 110 performs display (i.e., non-transparent) and the period when the image sensor 140 performs image capture (i.e., the period when the transparent display apparatus 110 does not perform display and renders transparent) are separated in time sequence. As shown in FIG. 2, the transparent display apparatus 110 performs display during frame periods (such as Frame1 to Frame4) based on the frame display signal Sdp, and the image sensor 140 performs image capture during capture periods (such as L01 and L02).

In the present embodiment, two frame periods (such as Frame1 to Frame4) are grouped together, and the two frame periods in a group (such as Frame1 to Frame4) are compressed the time backward and forward respectively, to arrange the capture periods (such a L01 and L02) for the image sensor 140 to perform image capture. In other words, the two frame periods (such as Frame1 to Frame4) adjacent to each of the capture periods (such as L01, L02) are different from the two frame periods (such as Frame1 to Frame4) adjacent to the other of the capture periods (such as L01, L02).

Moreover, in the present embodiment, since each of the capture periods (such as L01, L02) is obtained by compressing the two frame periods (such as Frame1 to Frame4) adjacent thereto, it may have a longer exposure time, which may be performed at night. In other words, the timing configuration where the two frame periods (such as Frame1 to Frame4) adjacent to each of the capture periods (such as L01, L02) are different from the two frame periods (such as Frame1 to Frame4) adjacent to the other of the capture periods (such as L01, L02) may be implemented during nighttime periods.

FIG. 3 is a second timing diagram illustrating the operation of the vehicle monitoring and display system according to an embodiment of the disclosure. Referring to FIG. 1 and FIG. 3, in the present embodiment, the period when the transparent display apparatus 110 performs display (i.e., non-transparent) and the period when the image sensor 140 performs image capture (i.e., the period when the transparent display apparatus 110 does not perform display and renders transparent) are separated in time sequence. As shown in FIG. 3, the transparent display apparatus 110 performs display during the frame periods (such as Frame1 to Frame4) based on the frame display signal Sdp, and the image sensor 140 performs image capture during the capture periods (such as L01 to L04).

In the present embodiment, the frame periods (such as Frame1 to Frame4) and the capture periods (such as L01 to L04) are disposed alternately, i.e. each frame period (such as Frame1 to Frame4) is compressed forward to arrange the corresponding capture period (such as L01 to L04). Compared to the timing configuration shown in FIG. 2, if the frame refresh rate of the transparent display apparatus 110 remains the same, the capture periods (such as L01 to L04) shown in FIG. 3 may be shorter than the capture periods (such as L01, L02) shown in FIG. 2. Therefore, this timing configuration may be performed at dusk or when traveling in a tunnel, but at night or in situations with insufficient light, it may affect the imaging effect of the image sensor 140. In other words, the alternating arrangement of the frame periods (such as Frame1 to Frame4) and the capture periods (such as L01 to L04) may be implemented during the dusk periods or periods when traveling in a tunnel.

Figure 4:
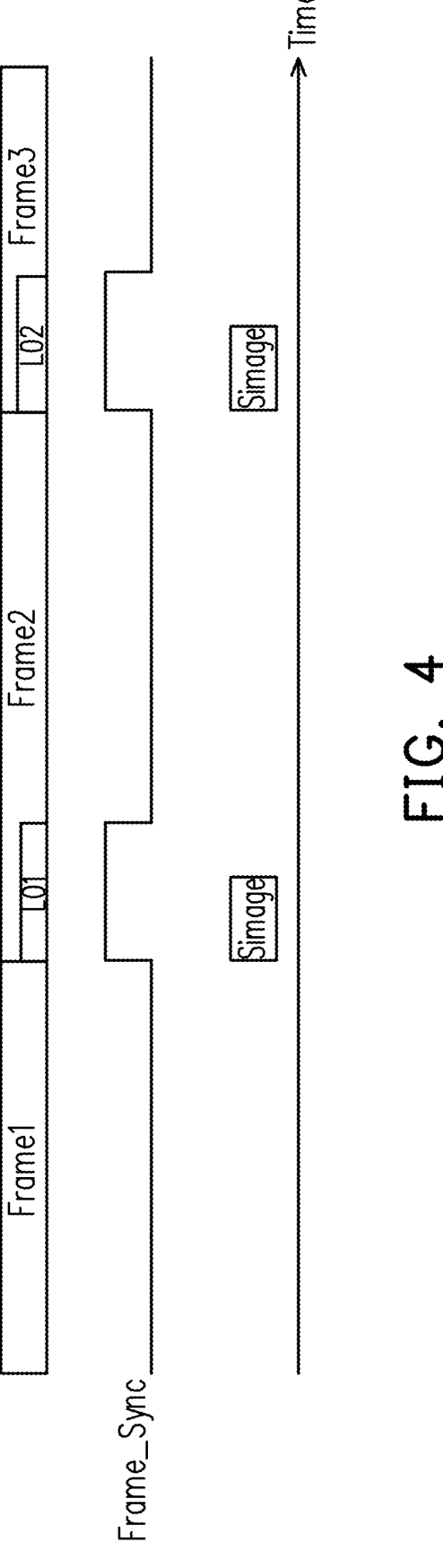
FIG. 4 is a third timing diagram illustrating the operation of the vehicle monitoring and display system according to an embodiment of the disclosure.

FIG. 4 is a third timing diagram illustrating the operation of the vehicle monitoring and display system according to an embodiment of the disclosure. Referring to FIG. 1 and FIG. 4, in the present embodiment, the period when the transparent display apparatus 110 performs display (i.e., non-transparent) and the period when the image sensor 140 performs image capture (i.e., the period when the transparent display apparatus 110 does not perform display and renders transparent) are separated in time sequence. As shown in FIG. 4, the transparent display apparatus 110 performs display during the frame periods (Frame1 to Frame3) based on the frame display signal Sdp, and the image sensor 140 performs image capture during the capture periods (such as L01, L02).

In the present embodiment, each of the capture periods (such as L01 to L04) is disposed to overlap with a part of the corresponding one of the frame periods (such as Frame1 to Frame4). Here, the capture period L01 and the frame period Frame2 are overlap disposed. And, assuming the position where the image sensor 140 is disposed corresponds to the center point position of the transparent display apparatus 110, therefore, when the frame period Frame2 starts scanning, the center point position of the transparent display apparatus 110 should not yet be illuminated (i.e., points where images are not displayed). At this time, the center point position of the transparent display apparatus 110 renders transparent, thereby the image sensor 140 may perform image capture, as shown in the capture period L01.

In the present embodiment, since the capture periods (such as L01, L02) occupy the time in the frame periods (Frame1 to Frame3) for part of the pixel rows, they have a relatively short exposure time, which may be performed during the day. However, at dusk or in situations with slightly weak light, it may affect the imaging of the image sensor 140. In other words, the overlapping arrangement of each of the capture periods (such as L01, L02) with the corresponding one of the frame periods (such as Frame1 to Frame3) may be implemented during daytime periods.

In the present embodiment, implementation during daytime/dusk/night corresponds to lighting situations. Therefore, in the embodiments from FIG. 2 to FIG. 4, one of the embodiments from FIG. 2 to FIG. 4 may be selected based on whether the image from the image sensor 140 is overexposed or underexposed. Taking the embodiment of FIG. 2 as an example, in case of overexposure, it may switch to the embodiment of FIG. 4, or in case of underexposure, it may switch to the embodiment of FIG. 2. However, the embodiments of the disclosure are not limited there.

Figure 5:
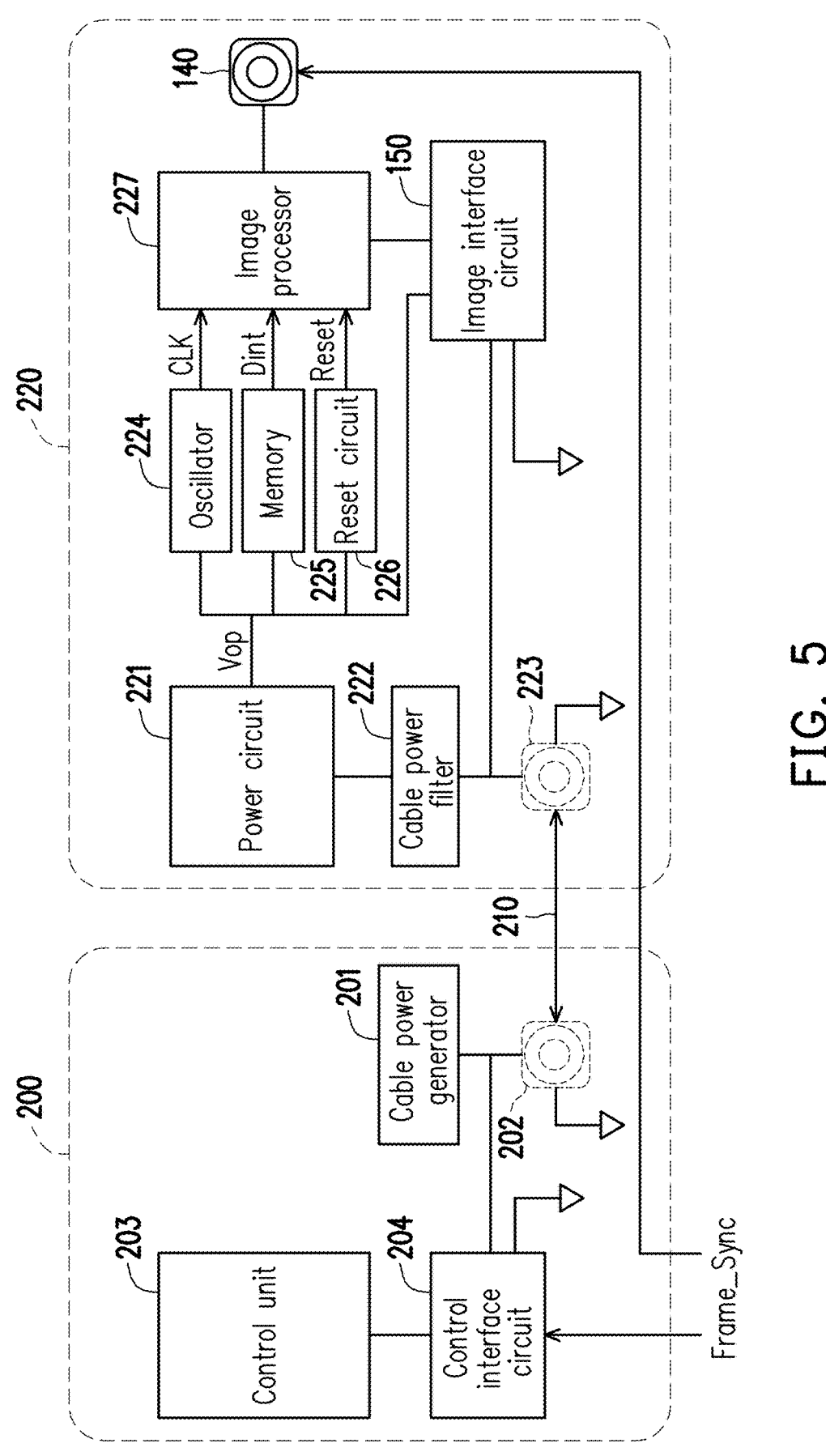
FIG. 5 is a transmission diagram illustrating a frame synchronization signal of the vehicle monitoring and display system according to an embodiment of the disclosure.

FIG. 5 is a transmission diagram illustrating a frame synchronization signal of the vehicle monitoring and display system according to an embodiment of the disclosure. Referring to FIG. 1 and FIG. 5, wherein the same or similar components use the same or similar labels. In the present embodiment, the image sensor 140 and the image interface circuit 150 may be located in the camera module 220, i.e. the vehicle monitoring display system 100 may further include the camera module 220, and the camera module 220 is coupled to the control circuit 200.

In the present embodiment, the control circuit 200 includes a cable power generator 201, a cable connector 202, a control unit 203, and a control interface circuit 204. Furthermore, the camera module 220 further includes a power circuit 221, a cable power filter 222, a cable connector 223, an oscillator 240, a memory 225, a reset circuit 226, and an image processor 227.

The control interface circuit 204 is coupled to the cable power generator 201, the cable connector 202, and the control unit 203. The cable connector 202 is coupled to the cable connector 223 through the cable 210. The power circuit 221 is coupled to the cable connector 223 through the cable power filter 222, and the power circuit 221 is coupled to the oscillator 240, the memory 225, the reset circuit 226, and the image interface circuit 150 to provide the operating voltage Vop required for operation. The image processor 227 is coupled to the image interface circuit 150, the oscillator 240, the memory 225, and the reset circuit 226 to receive the clock signal CLK from the oscillator 240, the internal data Dint from the memory 225, and the reset signal Reset from the reset circuit 226. Furthermore, the image interface circuit 150 is coupled to the cable connector 223.

In the present embodiment, the frame synchronization signal Frame_Sync from the image controller 120 is transmitted to the image sensor 140 through a separate wire. The image sensor 140 may start exposure at the rising edge of the frame synchronization signal Frame_Sync. Furthermore, the image sensor 140 completes the exposure of the three primary colors of Red, Green, and Blue and/or the exposure of Near-infrared (NIR) within a limited time (the time defined by the frame synchronization signal Frame_Sync). The frame synchronization signal Frame_Sync and the exposure cycle of the image sensor 140 must be precisely synchronized. Additionally, extra wires/components are needed to transmit the frame synchronization signal Frame_ Sync.

Figure 6:
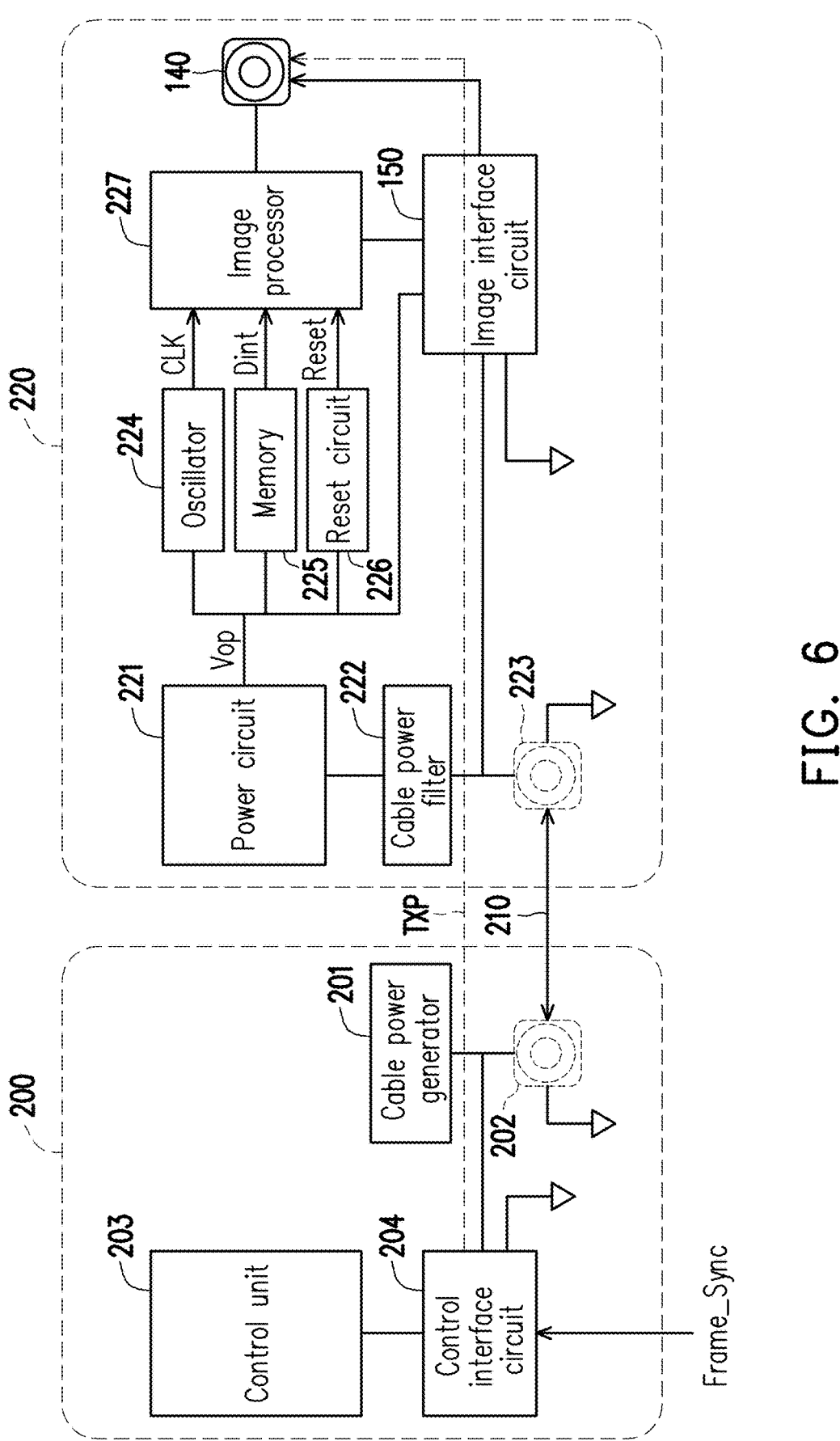
FIG. 6 is a transmission diagram illustrating a frame synchronization signal of the vehicle monitoring and display system according to another embodiment of the disclosure.

FIG. 6 is a transmission diagram illustrating a frame synchronization signal of the vehicle monitoring and display system according to another embodiment of the disclosure. Referring to FIG. 1, FIG. 5, and FIG. 6, where the same or similar components use the same or similar labels. In the present embodiment, the image interface circuit 150 is coupled to the image sensor 140, and the frame synchronization signal Frame_Sync is transmitted to the image sensor 140 along the transmission path TXP. In other words, the control interface circuit 204 transmits the frame synchronization signal Frame_Sync through the cable 210. At this time, the image sensor 140 is always in a standby state. Furthermore, the image sensor 140 completes the exposure of the three primary colors of Red, Green, and Blue and/or the exposure of Near-infrared (NIR) within a limited time (the time defined by the frame synchronization signal Frame_Sync). The frame synchronization signal Frame_Sync, wire delay, and the exposure control of the image sensor 140 must be precisely synchronized.

Figure 7:
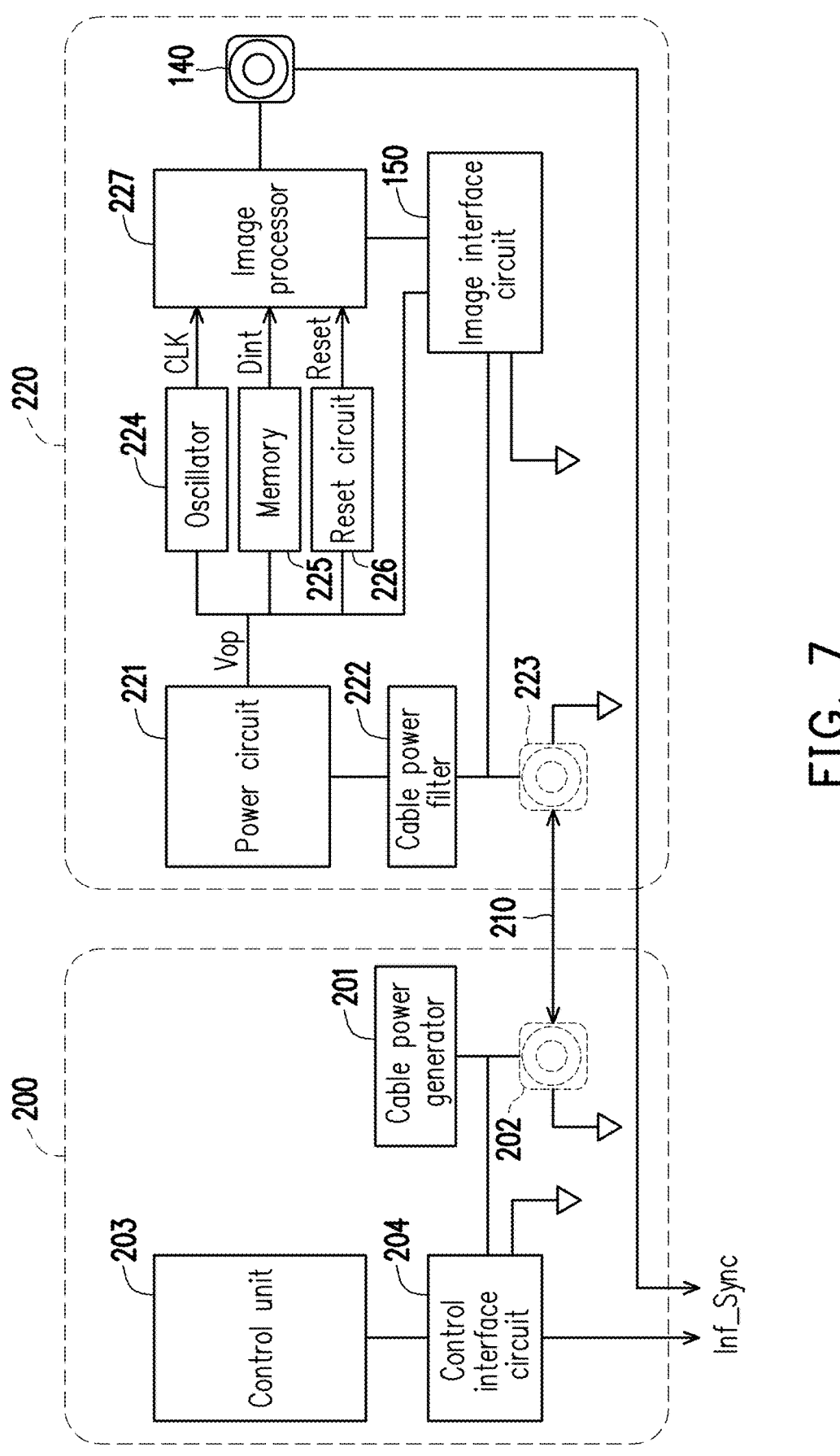
FIG. 7 is a transmission diagram illustrating the timing information of the vehicle monitoring and display system according to an embodiment of the disclosure.

FIG. 7 is a transmission diagram illustrating the timing information of the vehicle monitoring and display system according to an embodiment of the disclosure. Referring to FIG. 1, FIG. 5, and FIG. 7, where the same or similar components use the same or similar labels. In the present embodiment, the image sensor 140 refreshes the image signal Simage at a fixed rate and provides a synchronization signal Inf_Sync related to the frame refresh rate to the image controller 120 through a separate wire. At this time, the image sensor 140 may change from passive capture to active capture, and operate in conjunction with the transparent display apparatus 110. The method of conjunction may refer to FIG. 1 to FIG. 4, which will not be repeated here.

Figure 8:
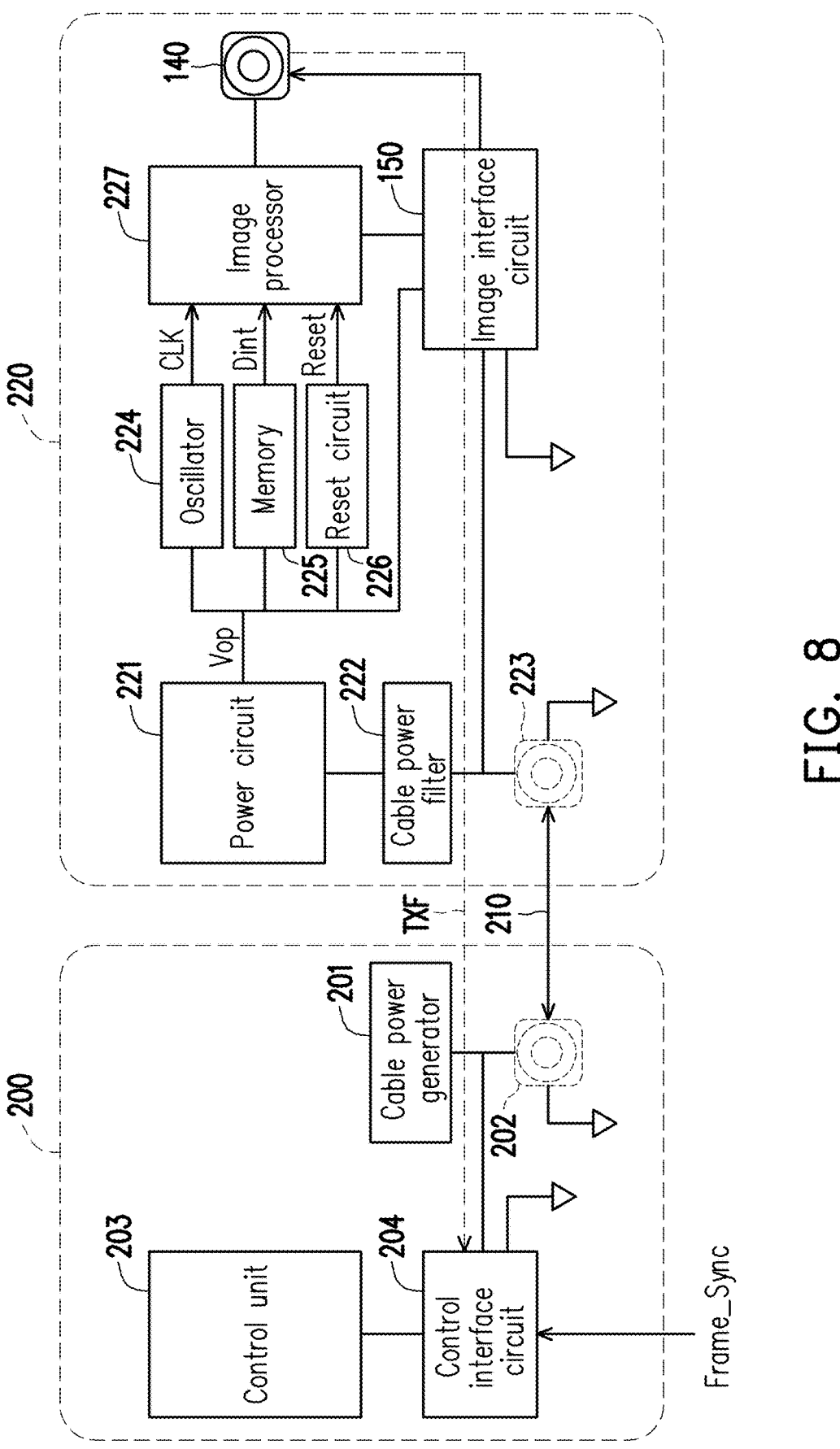
FIG. 8 is a transmission diagram illustrating the timing information of the vehicle monitoring and display system according to another embodiment of the disclosure.

FIG. 8 is a transmission diagram illustrating the timing information of the vehicle monitoring and display system according to another embodiment of the disclosure. Referring to FIG. 1, FIG. 5, and FIG. 7, where the same or similar components use the same or similar labels. In the present embodiment, the image sensor 140 refreshes the image signal Simage at a fixed rate and provides a synchronization signal Inf_Sync related to the frame refresh rate to the image controller 120 along the transmission path TXF. At this time, the image sensor 140 may change from passive capture to active capture, and operate in conjunction with the transparent display apparatus 110. The method of conjunction may refer to FIG. 1 to FIG. 4, which will not be repeated here.

In summary, in the vehicle monitoring and display system of embodiments of the disclosure, the transparent display apparatus and the image sensor may operate synchronously based on the frame synchronization signal, allowing the image sensor to capture images when it is not masked by the images displayed on the transparent display apparatus. Therefore, the image sensor may be disposed under the panel of the transparent display apparatus without affecting image capture, thereby omitting the corresponding arrangement space. Therefore, the vehicle monitoring and display system may improve the arrangeability of the interior space of the vehicles and enhance the visual perception of the interior space of the vehicles.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A vehicle monitoring and display system, comprising:
an image controller, providing a frame display signal and a frame synchronization signal;
a transparent display apparatus, coupled to the image controller, to display based on the frame display signal; and
an image sensor, masked by a part of the transparent display apparatus, and coupled to the image controller, to capture images based on the frame synchronization signal when the part of the transparent display apparatus renders transparent,
wherein an image capturing direction of the image sensor is masked by images displayed on the transparent display apparatus.

2. The vehicle monitoring and display system of claim 1, wherein the transparent display apparatus displays based on the frame display signal during a plurality of frame periods, and the image sensor captures images during a plurality of capture periods.

3. The vehicle monitoring and display system of claim 2, wherein the frame periods and the capture periods are disposed alternately.

4. The vehicle monitoring and display system of claim 3, wherein the frame periods and the capture periods are disposed alternately during a dusk period or during a period of traveling in a tunnel.

5. The vehicle monitoring and display system of claim 2, wherein two frame periods adjacent to each of the capture periods are different from two frame periods adjacent to another one of the capture periods.

6. The vehicle monitoring and display system of claim 5, wherein a timing configuration where the two frame periods adjacent to each of the capture periods are different from the two frame periods adjacent to another one of the capture periods is performed during a night period.

7. The vehicle monitoring and display system of claim 2, wherein each of the capture periods is disposed to overlap with a part of a corresponding one of the frame periods.

8. The vehicle monitoring and display system of claim 7, wherein a configuration where each of the capture periods is disposed to overlap with a part of a corresponding one of the frame periods is performed during a daytime period.

* * * * *